No. 793,966. PATENTED JULY 4, 1905.
J. THOMSON.
WATER METER.
APPLICATION FILED OCT. 19, 1903.
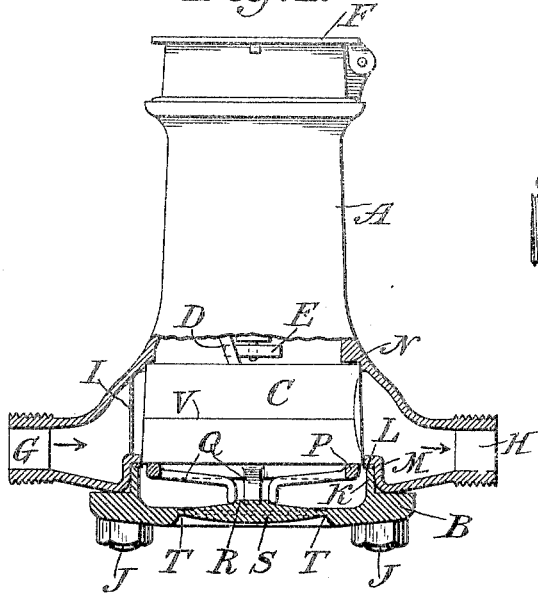
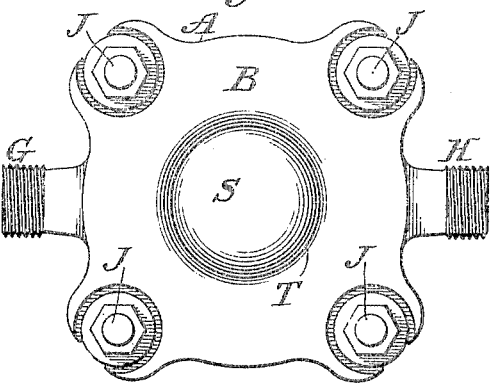
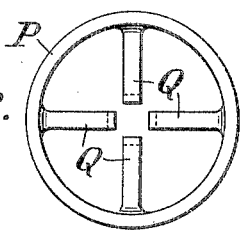
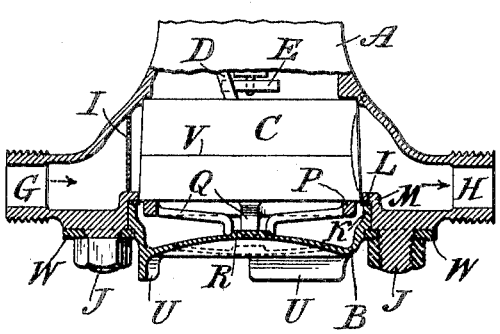
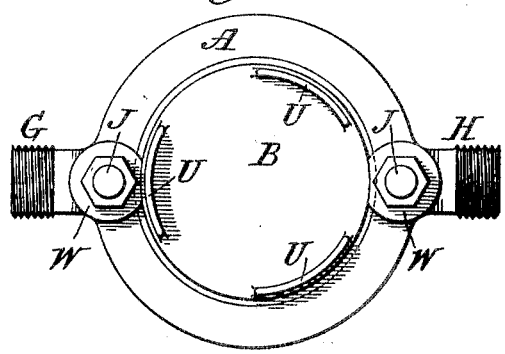
Attest:
A. N. Jesbera
Alfred W. Liddle
Inventor:
John Thomson
by Gerding Liddle Greeley
Attys.

No. 793,966.  
Patented July 4, 1905.

UNITED STATES PATENT OFFICE.

JOHN THOMSON, OF NEW YORK, N. Y., ASSIGNOR TO NEPTUNE METER COMPANY, OF NEW YORK, N. Y., A CORPORATION OF NEW JERSEY.

WATER-METER.

SPECIFICATION forming part of Letters Patent No. 793,966, dated July 4, 1905.

Application filed October 19, 1903. Serial No. 177,618.

*To all whom it may concern:*

Be it known that I, JOHN THOMSON, a citizen of the United States, residing in the borough of Manhattan, in the city of New York, in the county and State of New York, have invented certain new and useful Improvements in Water-Meters, of which the following is a specification.

The invention herein set forth was devised, primarily, in connection with water-meters, and hence the invention is shown in the accompanying drawings and hereinafter particularly described in connection with water-meters.

In the accompanying drawings, Figure 1 is a view, partly in elevation and partly in vertical section, of a water-meter embodying my invention. Fig. 2 is a bottom or under side view of the meter shown in Fig. 1. Fig. 3 is a detail view of the bracket or spider for supporting the internal disk-chamber casing. Fig. 4 is a view of the lower portion of a water-meter of the general construction shown in Fig. 1, the upper part being broken away, partly in elevation and partly in vertical section, embodying a modification of certain of the parts; and Fig. 5 is a bottom or under side view of the meter shown in Fig. 4.

It is well known that water when frozen increases in volume, and the expansion due to the transformation is practically irresistible, and the result is that when water freezes in a closed vessel the vessel will be distorted or disrupted at its weakened portion, causing a destruction of the vessel for further use unless some provision is made to save the essential or operative parts of the vessel or structure under the stress, as by providing some predetermined part designed to yield or break under the stress.

The meter shown in the accompanying drawings is a disk water-meter, and, referring to Figs. 1, 2, and 3, A is the main or outer casing; B is the lower inclosing head or bottom therefor; C is the internal casing or disk-chamber or chamber made in two parts containing the nutating disk; D is the spindle attached to the ball of the disk; E is the arm, which is connected to the shaft, forming a part of the registering mechanism located within the outer inclosing case A above the disk-chamber C, the registering mechanism not being shown; F is the hinged cover inclosing the dial and pointers, (not shown;) G is the inlet-port, and H the outlet-port, of the meter, and I is the usual screen for excluding from the meter foreign matter.

The shape of the bottom B is shown in Fig. 2, being rectangular with the rounding corners, each of which corners is slightly recessed, as shown in Fig. 2, and this bottom B is firmly secured to the outer casing A by the bolts J and in a water-tight manner by means of the perpendicular upwardly-projecting annular flange K of the bottom B, which flange engages with the gasket L and the overturned inwardly-projecting flange M of the main casing forming the seat for the gasket.

In order to support the disk-chamber casing C and to hold it to its seat N on the inside of the main casing, a bracket or spider is provided, preferably of the construction shown in Figs. 1, 3, and 4. In the construction of this supporting member shown in the drawings P is a ring having inwardly-projecting radial arms Q, the inner ends of which depend and are designed to rest upon the bottom B, as shown in Fig. 1. The outer diameter of the ring P, as shown, is very nearly of the same diameter as the diameter of the bottom of the disk-chamber C, furnishing thereby a large support for the disk-chamber; but I desire it to be understood that my invention is not limited to the particular construction of supporting member for the disk-chamber shown in the drawings and hereinabove described, nor that the supporting member shall spread across the entire bottom of the disk-chamber, the essential function of the supporting member being that it shall furnish an adequate support for the disk-chamber casing. The gasket L is not designed to but may project inwardly over the flange K. As shown in the drawings, this gasket does not project to any substantial extent over the flange K; but if this gasket should project thereover the disk-chamber casing in that event would rest upon the gasket to a slight extent, as well as upon the supporting member.

On the inner side of the bottom B is a stud R, which is encircled by the depending arms or prongs Q of the supporting member, as shown in Fig. 1, whereby the supporting member or bracket is held in central position. The position and arrangement of the several parts when the meter is in normal operative condition is shown in Fig. 1, and in order to save the operative parts of the meter from destruction in the event the water within the meter should freeze a section, as S, of the bottom B is shown recessed or weakened, this weakened section being designed to yield, break, or blow out under the expansive force of the frozen water, the yielding or rupture taking place at the thinnest or weakest place T. In practical use of the meters shown in Figs. 1, 2, and 3 the upper portion of the outer inclosing case above the disk-chamber would contain water, the lower portion of the outer inclosing case would contain water including the space below the bottom of the disk-chamber surrounding the bracket or spider, and the disk-chamber itself would contain water. All of the parts of the meter, including the weakened section S, would be designed to withstand the ordinary pressures in service, such as the hydrostatic head, water-ram, and the like; but the weakened section S would be designed to yield under the excessive pressure due to the freezing of the contained water. It is of course not possible to definitely state in advance the exact manner of freezing or the location within the meter where the freezing would first take place under all circumstances; but no matter where the freezing occurs whenever the pressure within the meter becomes greater than the meter is designed normally to withstand this excessive pressure will travel in the direction of the least resistance—to wit, in the structure shown in the direction toward the weakened section S— and will disrupt or fracture this weakened section at the annular portion T and force or blow out this weakened section, thereby affording the requisite relief to the pressure. If, for example, the entire body of water within the meter should have frozen and with the relief of pressure consequent upon the rupture of the weakened section S the disk-chamber casing will have been forced away from its upper seat N by the pressure of the ice above it, the disk-chamber casing will also have separated into its two component parts at the line of separation V by the pressure of the ice within it, the ice will flow through the opening in the bottom B produced by the fracture or blowing out of the weakened section S and the disk-chamber casing C, and the supporting-bracket will move with the moving or flowing of the ice, and under some circumstances a plug of ice will protrude through the opening. If the entire body of water within the meter shall, however, not have become frozen but yet the pressure be too great, then when the weakened section S yields or gives way the water within the meter-case will run out of the opening, thus affording the requisite relief and permitting the ice to flow and accommodate itself within the meter-casings.

In the construction of the various parts of the meter shown in Figs. 1, 2, and 3 I prefer to make the outer inclosing case or main casing A of composition metal, which will possess a high degree of tenacity and flexibility, the disk-chamber casing C of bronze, the supporting-bracket of more ductile composition, and the bottom B of cast-iron or low-grade brass.

From the foregoing it will be observed that in the event of freezing none of the essential operative parts of the meter will be damaged, and the only consequence of such freezing will be to cause the weakened section S to yield or break, and in order to make the meter entirely operative again it will only be necessary to furnish a new bottom B and assemble the parts, securely uniting them together in the manner hereinbefore explained.

I do not limit myself to any particular dimension or size of weakened section or area in the bottom B, for it is obvious that the relative size of this weakened section will depend in some measure upon the character of the metals of which the several parts of the meter are composed. When the several parts are made of the metals hereinbefore referred to, I have found that the relative area of weakened section shown in Fig. 1 is entirely adequate to afford the requisite relief, nor do I limit myself to the particular manner of weakening this section, (illustrated in section in Fig. 1,) for it is obvious that this weakening may be variously produced.

When the diameter of the weakened section S is less than the diameter of the disk-chamber casing C or its supporting-bracket, the disk-chamber casing and its supporting-bracket will be prevented from dropping through the opening formed in the bottom B when the section S has been blown out and after the ice has melted, as will be readily understood.

Referring to Figs. 4 and 5, the general construction and arrangement of the parts heretofore described in connection with Figs. 1, 2, and 3 are the same in the construction of meter shown in Figs. 4 and 5, the parts in Figs. 4 and 5 corresponding to the parts in Figs. 1, 2, and 3 being similarly lettered. In the meter shown in Figs. 4 and 5 the bottom is circular in form, being provided with feet U, as many of which as may be desired, three of such feet being shown in the drawings, and this bottom is secured to the outer inclosing case A by the bolts J and the washers W and in a water-tight manner by means of the perpendicular annular flange K, gasket L, and seat M, as hereinbefore explained in the structure shown in Figs. 1, 2, and 3. The supporting member or bracket is the same in construction as shown in Fig. 3, and the depending arms or prongs Q rest upon the bottom B and encircle the central stud R in order to maintain the bracket disposed centrally in position, as before explained. In this construction the bottom B is made of tough ductile metal and in its normal condition is bowed, as shown in Fig. 4. Should the water within the meter freeze, as hereinbefore referred to in connection with the construction shown in Figs. 1 and 2, the pressure induced thereby will when it has become greater than the bottom will normally withstand cause the bottom B to deflate or spring downwardly and outwardly, as shown in dotted lines in Fig. 4, thus affording the requisite relief of the pressure and permitting the ice within the meter to move or accommodate itself within the consequent enlarged space, the disk-chamber and the bracket moving downwardly with the movement of the ice. When the ice has melted, it will only be necessary in order to restore the meter to operative condition to force back the bottom B to its normal condition, as shown in full lines in Fig. 4. Should, however, in any case the pressure be great enough to disrupt the bottom B, a new bottom would have to be secured to the meter-case, the same as heretofore explained in connection with the meter shown in Figs. 1 and 2.

What I have heretofore set forth with reference to the relative area of the opening in the bottom B in connection with the meter shown in Figs. 1 and 2 is applicable to the meter shown in Figs. 4 and 5. While, as stated before, this invention was devised, primarily, for use in connection with water-meters, yet I do not limit my invention to its use in connection with water-meters *per se*, for my invention may be applied to other structures, and therefore while in the claims hereinafter following I claim my invention as applied to water-meters yet I desire it to be understood that I use the term "water-meter" to include not only water-meters *per* se, but all analogous and other structures to which my invention may be applied.

In the claims hereinafter following I use the term "yielding" to include all sorts of yielding or bending and all sorts of breaking or fracture.

What I claim as my invention is—

1. In a water-meter the combination with a main casing, of an internal casing, an inclosing head for the main casing provided with a yielding section, means to support the internal casing, such supporting means being itself supported solely by the yielding section of the inclosing head near the center thereof, substantially as and for the purpose set forth.

2. In a water-meter, the combination with a main casing, of an internal casing adapted to yield under internal pressure, an inclosing head for the main casing, a support for the internal casing, said support being itself supported centrally upon the inclosing head of the main casing and engaged thereby, substantially as and for the purpose set forth.

3. In a water-meter, the combination with a main casing, of an internal casing and an inclosing head for the main casing provided with a yielding section of less diameter than the diameter of the internal casing and means to support the internal casing, said supporting means being itself supported solely by the yielding section near the center thereof, substantially as and for the purpose set forth.

4. In a water-meter, the combination with a main casing, of an internal casing, an inclosing head for the main casing, a yielding section in said inclosing head of less diameter than the diameter of the internal casing, a central stud on the yielding section, a support for the internal casing provided with depending feet or prongs which encircle said stud, substantially as and for the purpose set forth.

5. In a water-meter, the combination with a main casing, of an internal casing, an inclosing head for the main casing, provided with a yielding section, and a support for the internal casing itself supported solely by the yielding section near the center thereof, the diameter of the yielding section of the inclosing head for the main casing being less than the diameter of the support for the internal casing, substantially as and for the purpose set forth.

This specification signed and witnessed this 5th day of October, A. D. 1903.

JOHN THOMSON.

In presence of—
ALFRED W. KIDDLE,
A. N. JESBERA.